(12) United States Patent
Koutsky et al.

(10) Patent No.: US 8,056,980 B2
(45) Date of Patent: Nov. 15, 2011

(54) VEHICLE SEAT AND SPLIT CONSOLE ASSEMBLY

(75) Inventors: L. John Koutsky, Milan, IL (US); Dale R. Ropp, Buda, IL (US); Bradley T. Hebeler, Blue Grass, IA (US)

(73) Assignee: Sears Manufacturing Co., Davenport, IA (US)

( * ) Notice: Subject to any disclaimer, the term of this patent is extended or adjusted under 35 U.S.C. 154(b) by 0 days.

(21) Appl. No.: 12/494,368

(22) Filed: Jun. 30, 2009

(65) Prior Publication Data

US 2010/0006364 A1    Jan. 14, 2010

Related U.S. Application Data

(63) Continuation-in-part of application No. 12/218,041, filed on Jul. 10, 2008, now abandoned.

(51) Int. Cl.
*A47C 1/00* (2006.01)
*B60N 2/04* (2006.01)
*B60K 26/00* (2006.01)

(52) U.S. Cl. ................ 297/344.21; 180/329; 180/331; 296/65.06

(58) Field of Classification Search .............. 297/344.21–344.24, 344.26, 161, 297/171, 172; 180/329–331; 296/65.06, 296/65.07
See application file for complete search history.

(56) References Cited

U.S. PATENT DOCUMENTS

| | | | |
|---|---|---|---|
| 3,088,537 A | | 5/1963 | LeTourneau |
| 4,487,445 A | * | 12/1984 | Jonnston .................... 296/65.07 |
| 5,086,869 A | * | 2/1992 | Newbery et al. .............. 180/329 |
| 5,346,035 A | * | 9/1994 | Ueda et al. .................... 180/329 |
| 6,276,749 B1 | | 8/2001 | Okazawa et al. |
| 6,916,065 B2 | * | 7/2005 | Park ........................... 297/217.1 |
| 6,981,746 B2 | | 1/2006 | Chung et al. |
| 7,389,845 B2 | * | 6/2008 | Longueville et al. ......... 180/326 |
| 7,681,686 B1 | * | 3/2010 | Klas et al. .................... 180/331 |
| 2006/0201732 A1 | | 9/2006 | Dunn |

FOREIGN PATENT DOCUMENTS

| | | |
|---|---|---|
| EP | 0 658 458 A | 6/1995 |
| EP | 1 264 940 A | 12/2002 |
| WO | WO 99/42327 A | 8/1999 |

OTHER PUBLICATIONS

European Search Report—EP Appln. No. 09165114.1—Sears Mfg. Co. European Patent Office dated Nov. 9, 2009.
Office Action for U.S. Appl. No. 12/218,041, dated Aug. 18, 2010.

* cited by examiner

*Primary Examiner* — David Dunn
*Assistant Examiner* — Tania Abraham
(74) *Attorney, Agent, or Firm* — Lane & Waterman LLP (57) ABSTRACT

A vehicle seat assembly comprises a base; a seat mounted to swivel relative to the base; and a console having first and second segments, the first segment mounted to swivel with the seat relative to the base and the second segment being mounted to remain in fixed position as the seat and first console segment swivel. The console's two segments lie in a generally common horizontal plane and are separated by an arcuate spacing so that the first segment is located proximate the operator and the second segment is located distally of the operator. This arrangement of the seat assembly components allows the seated operator to rotate in the seat through a substantial arc, with the first console segment rotating as well while the second console segment remains stationary. In a second embodiment, the first and second console segments move with the seat as it swivels through a first rotational increment, but the second console segment remains stationary while the seat and first console segment swivel through a second rotational increment.

5 Claims, 9 Drawing Sheets

Fig. 15

VEHICLE SEAT AND SPLIT CONSOLE ASSEMBLY

This is a continuation in part of U.S. patent application Ser. No. 12/218,041, filed Jul. 10, 2008.

BACKGROUND OF THE INVENTION

The present invention relates to vehicle seating and, more particularly to a seat assembly useful in circumstances where the operator of the vehicle is desirably able to swivel in the operator seat to facilitate viewing behind or around the vehicle. The invention finds particularly advantageous application in seat assemblies that include a console associated with the operator's seat which houses various instruments useful in the operation of the vehicle.

It has been known for many years in the vehicle arts, and particularly in the field of agricultural and off the road construction equipment, to provide a console associated with the operator's seat which houses various vehicle instruments. Oftentimes these consoles are extensions of the right hand armrest and may include throttle, breaking and gear shift controls. Examples of such prior art armrest consoles are disclosed in U.S. Pat. Nos. 4,392,546; 5,566,778; 5,924,515 and 6,039,141. As vehicles have become more complex over time, the number of instruments or controls suitably positioned within the console has increased in number. As a result, the size of the console has increased.

Another seat assembly feature that has become increasingly important is the ability of the seat to swivel, giving the operator a better view of the vehicle's surroundings and particularly the area behind the vehicle. Therefore, it is now desirable to afford the operator the maximum amount of swivel possible.

The use of larger consoles has complicated the problem of increasing the swivel capabilities of the seat assembly (and particularly with respect to clockwise rotation of the seat which is most desired). Since the larger consoles effectively increase the "swing radius" of the seat assembly, the range of seat swivel is limited due to the console's contact with other stationary components of the vehicle cab.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

SUMMARY OF THE INVENTION

The present invention is directed to a vehicle seat assembly, comprising a base; a seat mounted to swivel relative to the base; and a console having first and second segments, the first segment being mounted to swivel with the seat relative to the base and the second segment being mounted to remain in fixed position as the seat and first console segment swivel.

The console's two segments may have upper surfaces that lie in a generally common horizontal plane; they are also preferably separated by an arcuate spacing. This arrangement of the seat assembly components allows the seated operator to rotate in the seat through a substantial arc, with the first console segment rotating as well while the second console segment remains stationary.

In a second embodiment, the first console segment is an inner segment and moves with the seat throughout the entire rotational arc of the seat, while the second console segment is an outer segment and it moves with the seat and first segment in an initial increment of rotation away from the straight ahead orientation but then remains in generally fixed position as the seat and first segment continue to rotate through an additional increment of rotation.

A significant advantage obtained through the use of the present invention is that a large console may be employed while giving the operator a maximum degree of rotation in the vehicle seat, and this can be achieved even when the vehicle's cab space is relatively small.

DETAILED DESCRIPTION OF THE PREFERRED EMBODIMENTS

Figure 1:
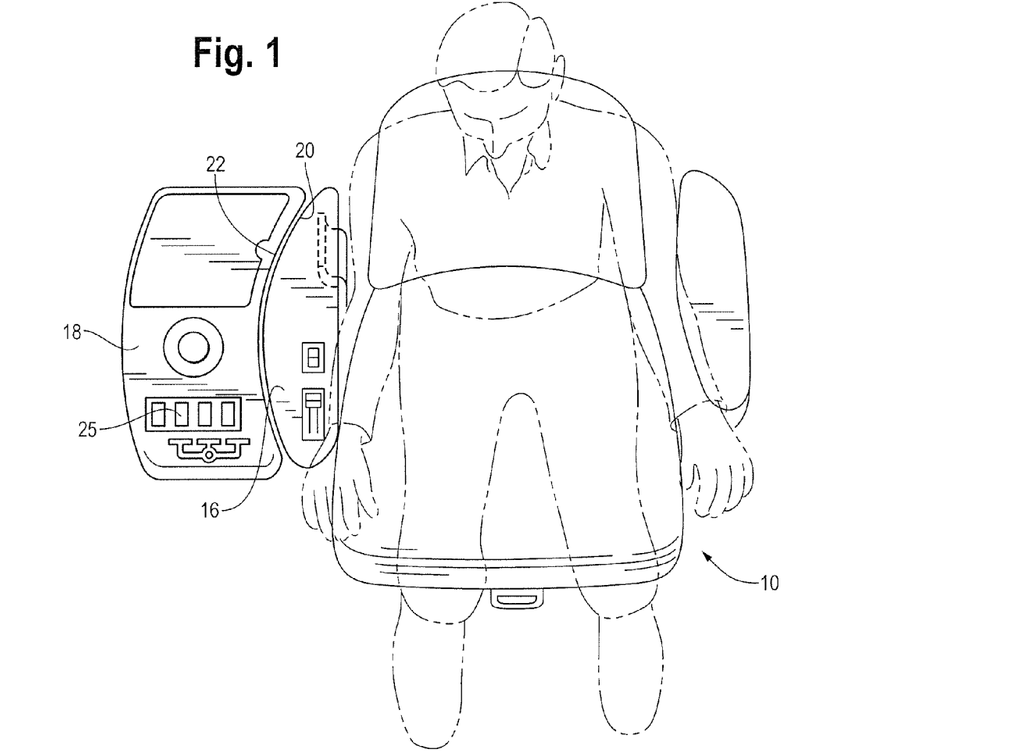
FIG. 1 is a plan view showing one embodiment of the present invention with a vehicle operator illustrated in phantom lines sitting in a vehicle seat having an associated console with inner and outer segments.
Figure 2:
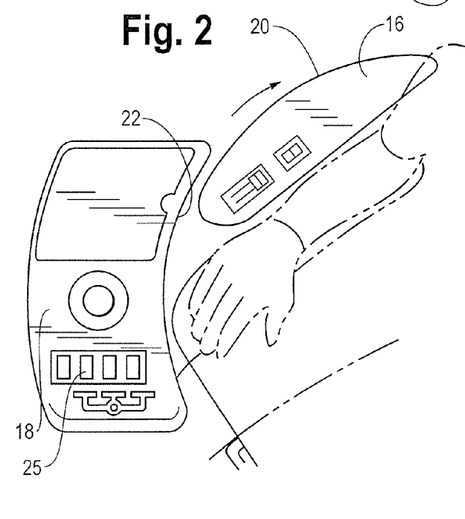
FIGS. 2 and 3 are partial plan views showing differing positions of the console segments relative to one another in the practice of the embodiment of FIG. 1.
Figure 3:
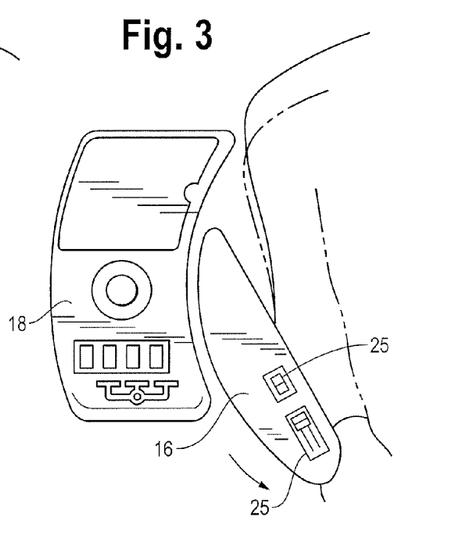
Figure 4:
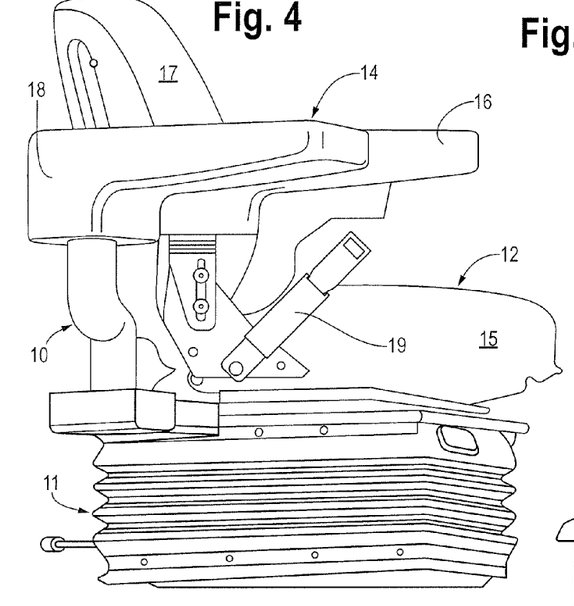
FIG. 4 is a perspective side view illustrating further structural details of the embodiment of FIG. 1.

With reference to FIGS. 1 to 4, a vehicle seat assembly is designated generally as 10 and includes base 11, seat 12 and console 14. The base is conventional and may include a variety of well known seat suspension components such as fore/aft and lateral isolators, air or mechanical springs, shock absorbers, and fore/aft and height adjustment devices. In addition, the base includes a swivel assembly to permit the seat to rotate in a horizontal plane relative to the base. Again, such swivel assemblies are well known to those of skill in the art and need not be described here. The seat 12 is also entirely conventional, having seat and backrest cushions, 15 and 17 respectively, and an operator restraint such as seat belt 19. The console 14 comprises first and second segments, 16 and 18 respectively, the first segment being located proximate the operator with the second segment being located distally of the operator. The first console segment may have an outer perimeter 20 with an arcuate configuration, with the second segment having a complimentary inner arcuate perimeter 22, so that the two segments are aligned but spaced slightly from one another when the seat assembly is positioned so the operator faces forwardly in the vehicle as shown in FIG. 1. Each of the console segments, 14 and 16, may house or mount one or more of a plurality of vehicle instruments or controls 25, all well known to those of skill in the art. Alternatively, all of the instruments 25 may be mounted to one or the other of the two console segments. Preferably, the two segments have upper surfaces that lie generally in a common horizontal plane. As illustrated in FIGS. 2 and 3, the first console segment 14 will swivel with the seat in either a clockwise or counter clockwise direction, while the second console segment 16 remains generally stationary.

Figure 5:
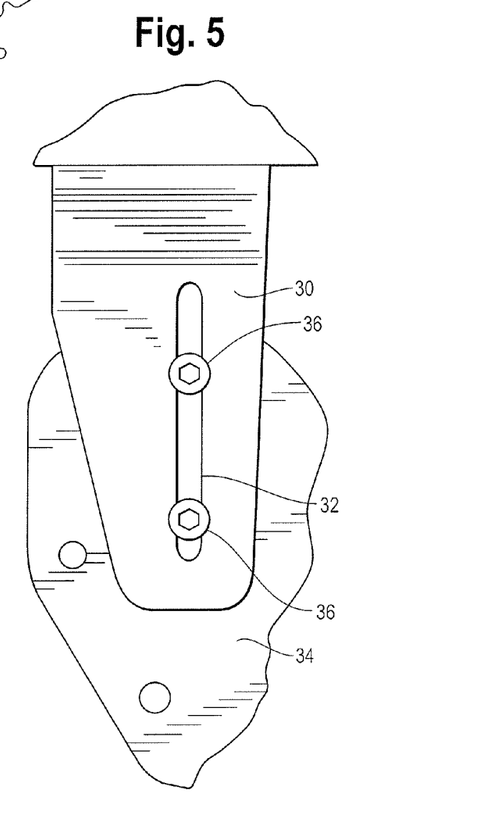
FIG. 5 is a partial side view showing details for mounting the first console segment.
Figure 6:
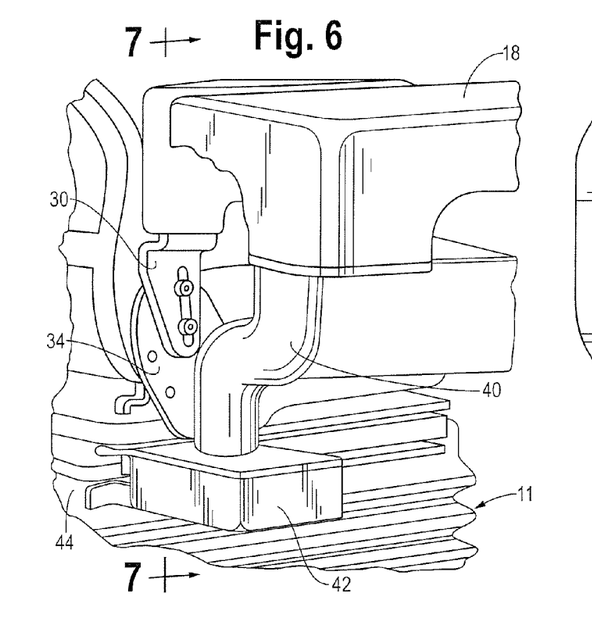
FIG. 6 is a partial side perspective view showing further details for mounting the console segments.
Figure 7:
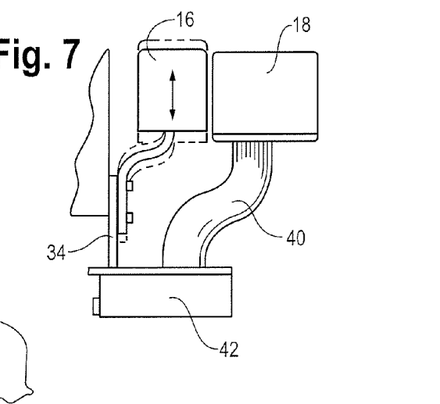
FIG. 7 is a partial rear view taken along line 5-5 of FIG. 6.

FIGS. 4 to 7 show further construction details for the mounting of the console segments in accordance with the preferred embodiment. In order to achieve the desired functionality of the present invention, it is necessary that the first console segment be mounted to the seat assembly at or above the upper or rotating component of the swivel sub assembly and the second console segment be mounted at or below the lower or stationary component of the swivel sub assembly. As illustrated in the preferred embodiment, the first console segment 14 is mounted to a support bracket 30 having an elongated slot 32. In turn, support bracket 30 may be mounted to a conventional seat side bracket 34 by means of bolts 36 positioned in slot 34. In this way, the first console segment 14 may be adjusted vertically relative to the second console bracket 16 as illustrated in FIG. 5. The second console segment 16 is mounted to a support arm 40 and support bracket 42, with the support bracket 42 mounted, in turn, to the base 11 at the lower plate 44 of the swivel sub assembly.

Figure 8:
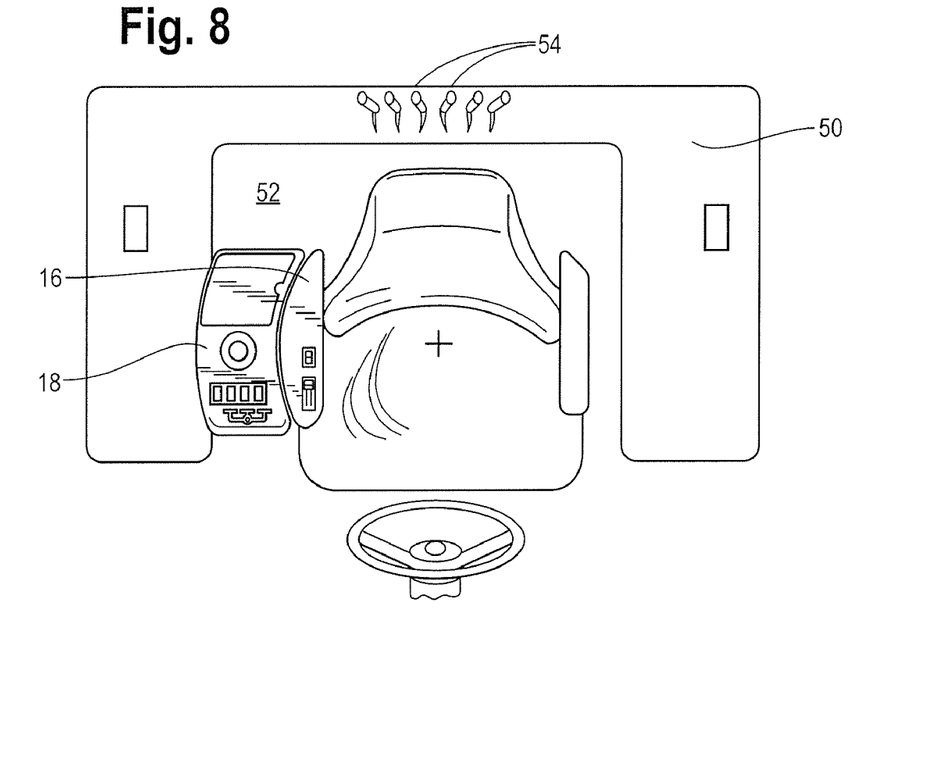
FIGS. 8 and 9 show different orientations of the seat and the console segments of the FIG. 1 embodiment as positioned within a vehicle cab compartment.
Figure 9:
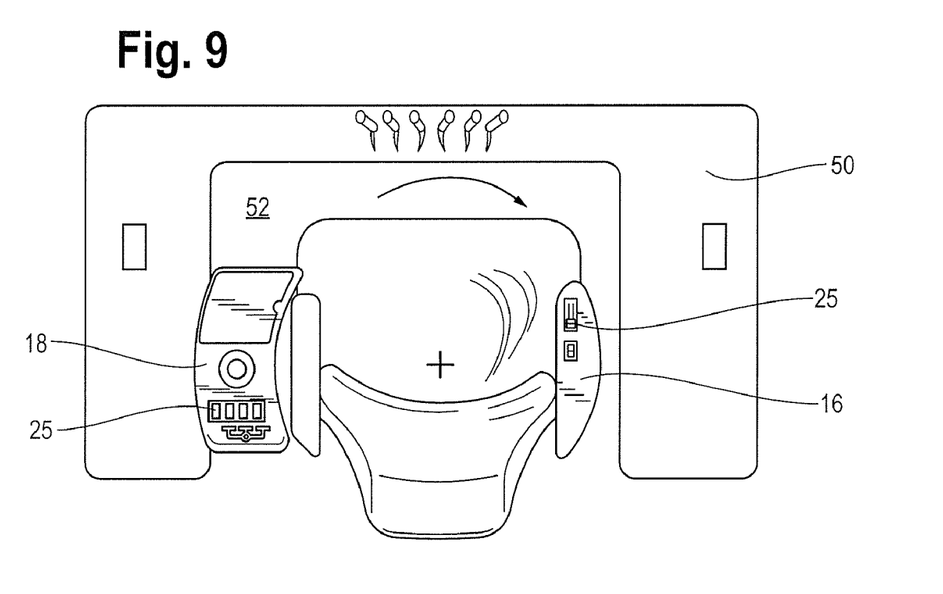

As shown in FIGS. 8 and 9, the seat assembly of the present invention is advantageously used in a vehicle having a cab 50 defining a cab compartment 52. FIG. 8 shows the seat facing forward, and FIG. 9 shows the seat rotated 180 degrees and facing rearward. In each situation the second console segment remains in the same position, but the first console segment rotates with the seat and the operator. Because the radial extent of the seat and first console is relatively small, the full rotation of the seat is possible, even in a relatively small cab compartment, without having the cab walls interfere with the rotating structures. In the illustrated embodiment, there are vehicle control instruments 54 positioned at the rear of the cab, but these same instruments may be located on the first console segment as well.

Figure 10:
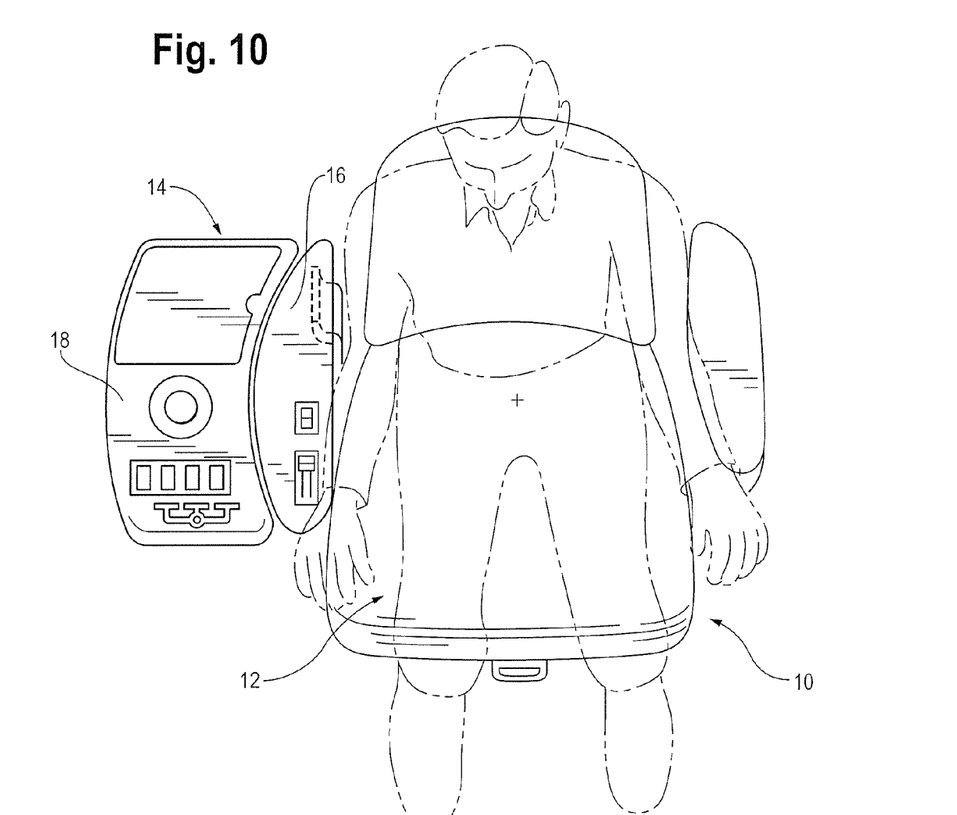
FIG. 10 is a plan view of another embodiment of the present invention also having a seat and inner and outer console segments.
Figure 10A:
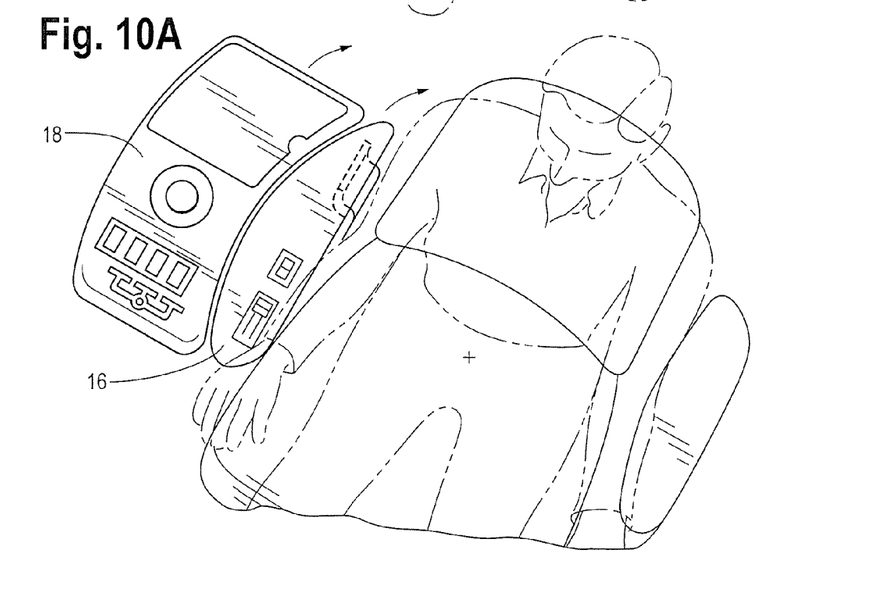
FIGS. 10A, 10B and 10C are partial plan views showing differing positions of the console segments relative to one another in the practice of the embodiment of FIG. 10 when the operator rotates or swivels in the clockwise direction away from a straight ahead or forward orientation.
Figure 10B:
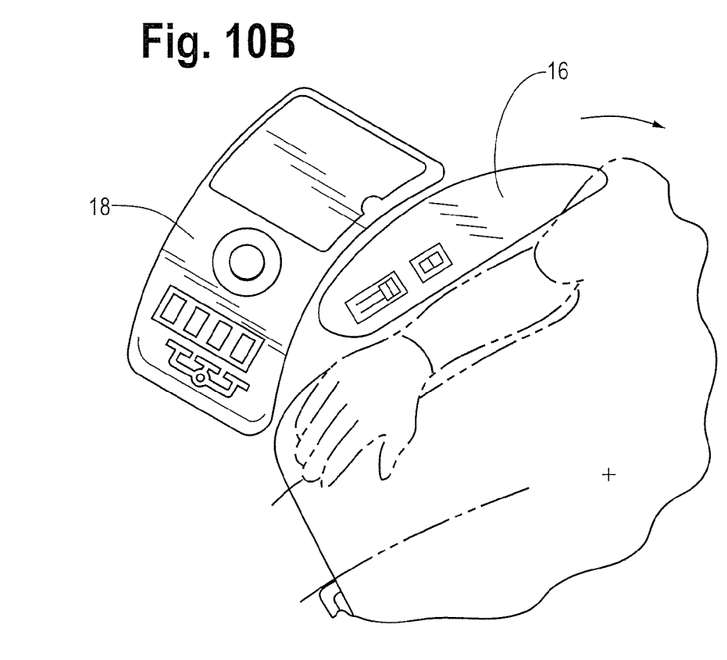
Figure 10C:
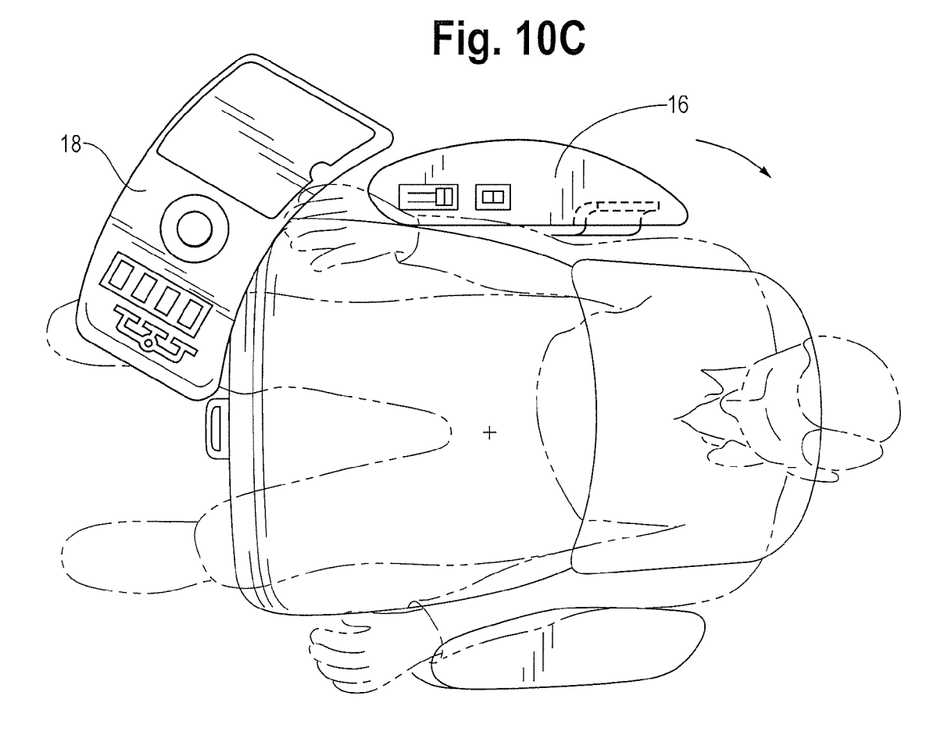
Figure 11:
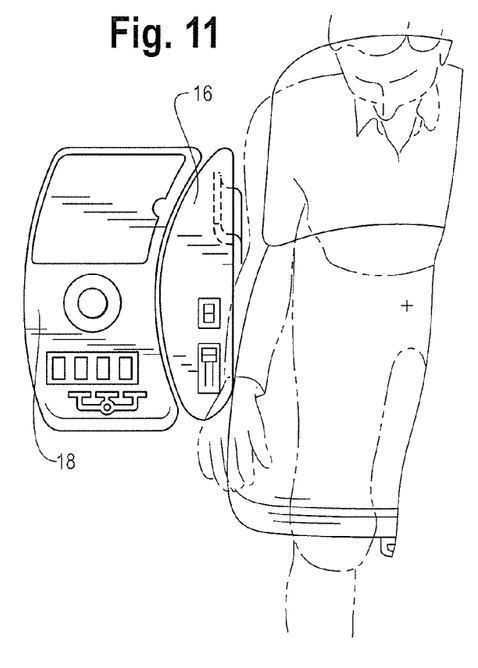
FIGS. 11, 11A and 11B are also partial plan views showing differing positions of the console segments relative to one another when the operator rotates in the counterclockwise direction away from a straight ahead or forward orientation.
Figure 11A:
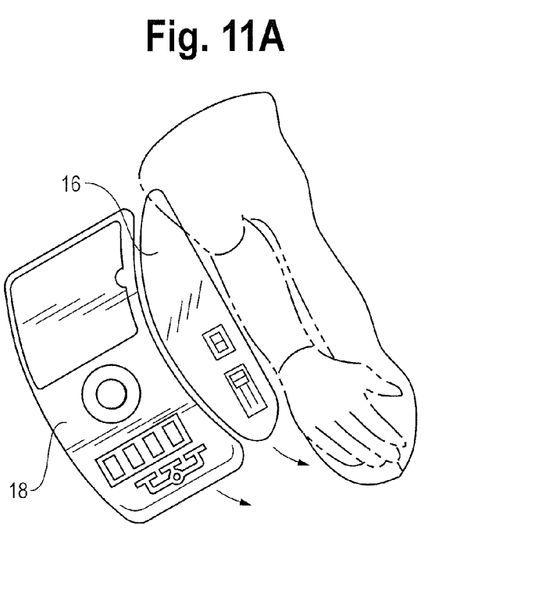
Figure 11B:
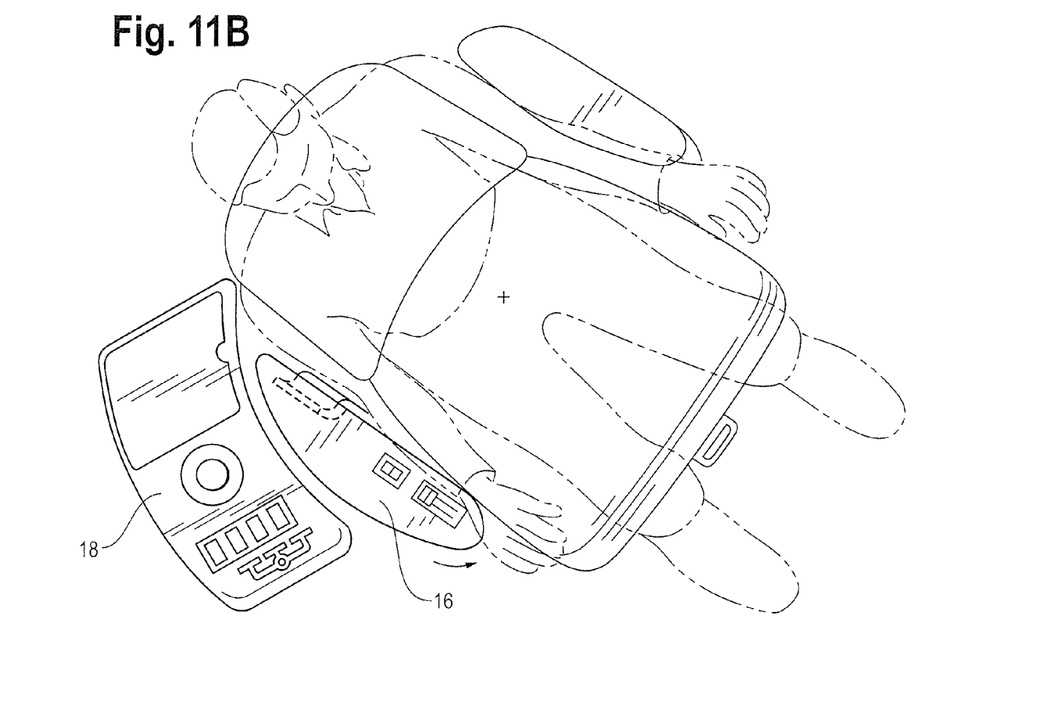

In the second embodiment of the invention, and as illustrated in the plan views of FIGS. 10-10C and 11-11B, the assembly 10 again includes a seat 12 and a console 14. The console 14, again, includes a first inner segment 16 and an outer segment 18. This arrangement of components is the same as the embodiment illustrated in FIG. 1. However, this second embodiment provides for limited movement of the second outer segment when the operator of the vehicle swivels either clockwise or counter clockwise. As shown in FIG. 10A, the second segment 18 moves with the seat 12 and first segment 16 as they swivel through an initial increment of rotation away from the straight ahead or forward facing orientation. But, as illustrated in FIGS. 10B and 10C, the second segment remains generally stationary as the seat and first segment continue through and additional increment of clockwise rotation. FIGS. 11, 11A and 11B show the same functionality when the operator swivels away from the straight ahead orientation in a counter clockwise direction.

Figure 12:
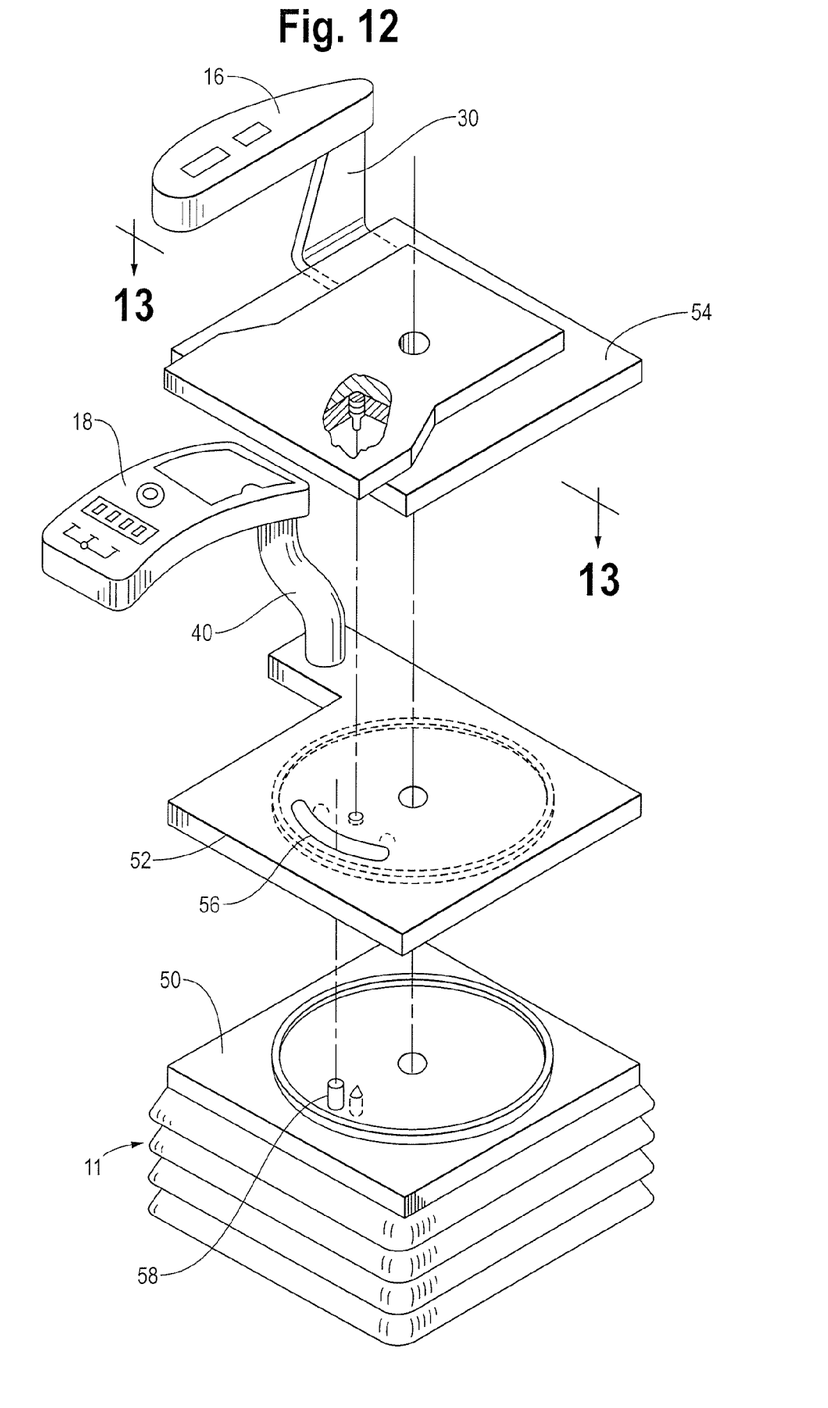
FIG. 12 is an exploded perspective view showing details of construction of the embodiment illustrated in FIGS. 10-11.
Figure 13:
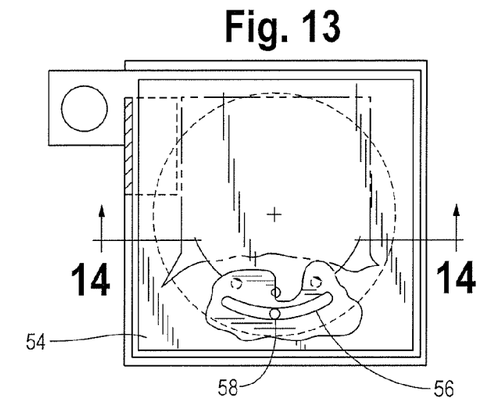
FIG. 13 is a top view taken along line 13-13 of FIG. 12 with portions broken away to show further details of construction.
Figure 13A:
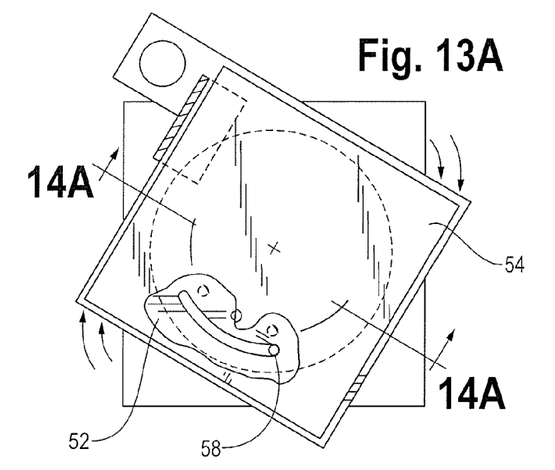
FIGS. 13A and 13B are plan views similar to that of FIG. 13, but showing the same components when the seat and console segments are in the positions shown in FIGS. 10A and 10B, respectively.
Figure 13B:
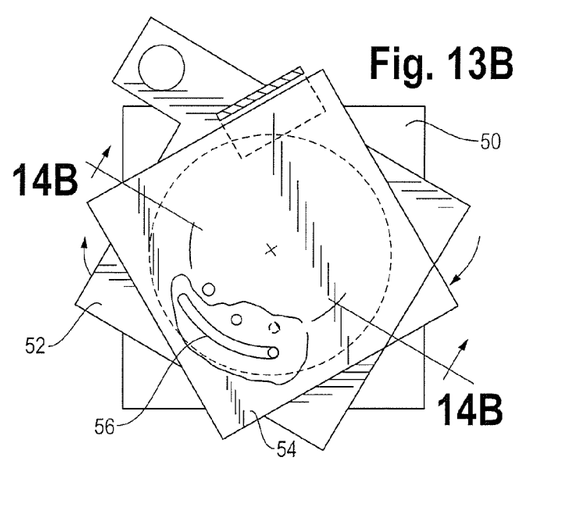
Figure 14:
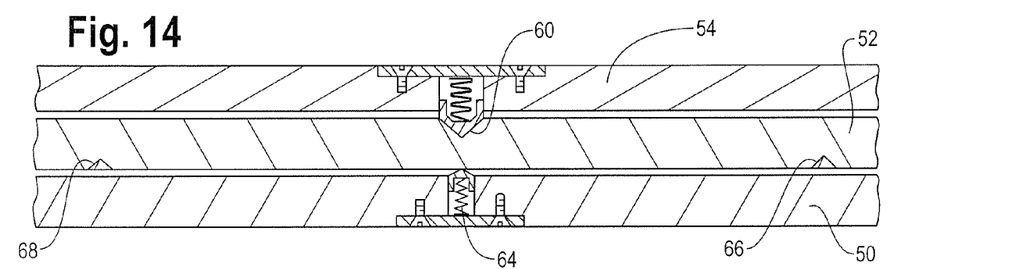
FIGS. 14, 14A, 14B, 14C and 15 are cross sectional views, taken as indicated from the various view lines shown in earlier Figures, and showing the relative movement of components supporting the console segments and links operated to control the relative movement of these components.
Figure 14A:
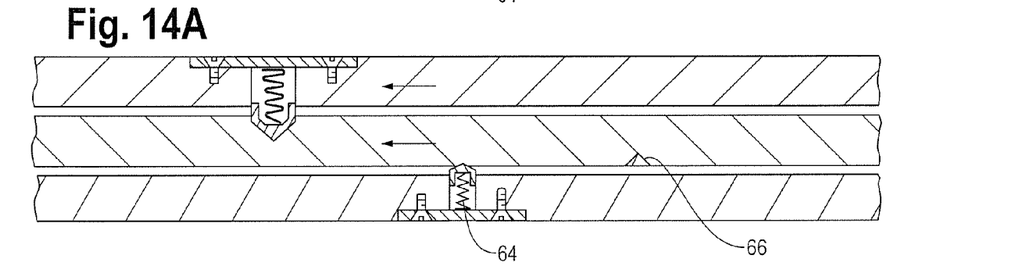
Figure 14B:
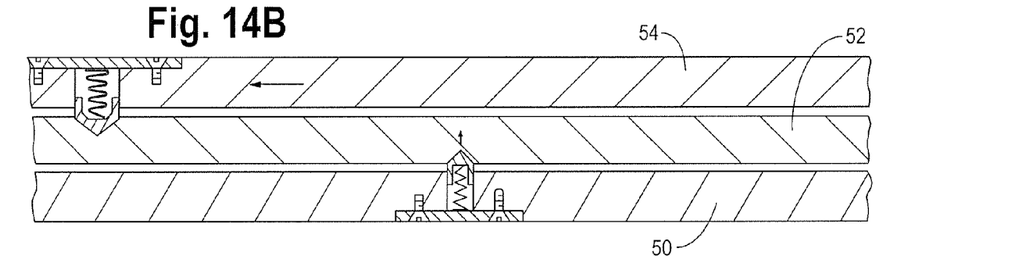
Figure 14C:
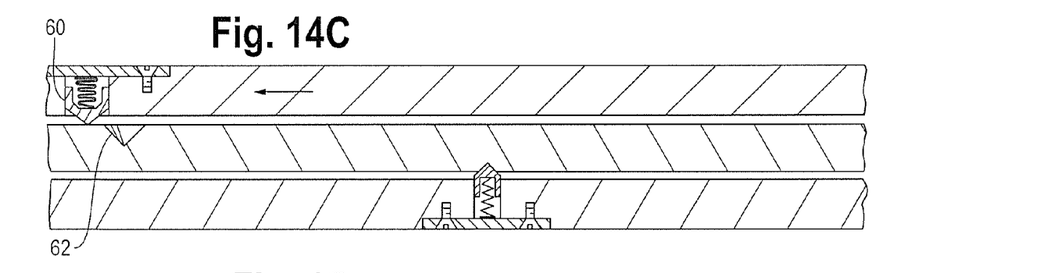
Figure 15:
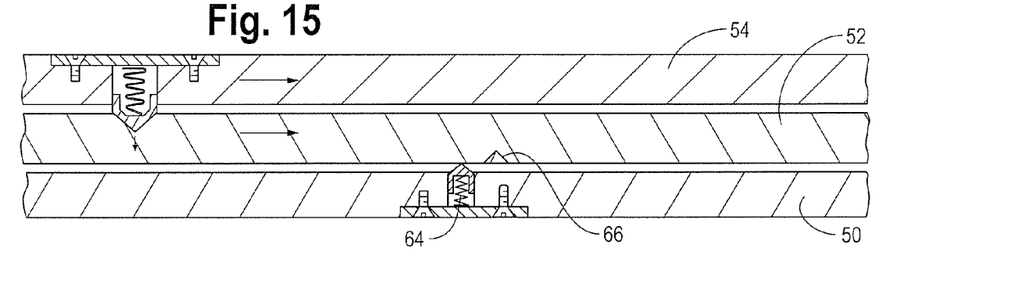

FIGS. 12 to 15 illustrate details of construction for the mounting and rotational movement of the seat and console assembly employed in the second embodiment of the invention shown in FIGS. 10 through 11B. In FIG. 12, the seat assembly is shown to have a base 11, including an upper base plate 50. A lower swivel member or plate 52 is rotatably mounted to base plate 11, and the second console segment 18 is supported or carried by the lower swivel plate 52 by means of support arm 40. An upper swivel member or plate 54 is, in turn, rotatably mounted to lower swivel plate 50, and the first console segment 16 is supported or carried by the upper swivel plate 54 by means of bracket 30.

The extent of rotation afforded the second console segment 18 in the practice of this embodiment is set by the length of an arcuate slot 56 located centrally on the forward facing side of lower swivel plate 52 and the position of an upstanding stop pin 58 on the base plate 50. A first link device, comprising a first spring biased detent 60 which engages recess 62, connects the lower and upper swivel members while they swivel together in the initial increment of rotation away from the forward facing orientation. The spring biased detent 60 engages the recess 62 and thereby drives the rotation of the lower swivel plate 52 with the upper swivel plate 54 until the stop pin 58 abuts the end of slot 56. At that point, a second link device, in the form of second detent 64 which engages recess 66, holds the lower swivel plate in place as the first detent 60 disengages from recess 62 and upper swivel plate continues to rotate. The second link device, being mounted to the rotationally stationary base plate 50, will hold the lower swivel 52 in fixed position while the upper swivel plate 54 rotates counter clockwise back toward the forward facing orientation. The same function is achieved when the operator initially rotates to his left, or counter clockwise, by virtue of the second link device engaging lower recess 68. Of course, in order to achieve this sequence of operation, it is necessary that the biasing force of the first link device be greater than the biasing force of the second link device. In other words, the spring biased detent 60 is strong enough to override the operation of the spring biased detent 64.

It will be appreciated by those skilled in the art that various changes and modifications can be made to the illustrated embodiments without departing from the spirit of the present invention. All such modifications and changes are intended to be covered by the appended claims.

We claim:

1. A vehicle seat assembly, comprising:
   a seat suspension mounted to a vehicle;
   a seat mounted to the suspension and adapted to swivel relative to the vehicle;
   a console also mounted to the suspension and having first and second segments with each console segment housing one or more vehicle control instruments, the first segment adapted to swivel with the seat, and the second segment being mounted to swivel together with the seat and first console segment through one increment of rotation and thereafter to remain in fixed position as the seat and first console segment swivel through a second increment of rotation.

2. The vehicle seat assembly of claim 1 wherein the seat, first console segment and second console segment are capable of rotation in either a clockwise or counterclockwise direction away from a forward facing orientation.

3. The vehicle seat assembly of claim 1 wherein the second console segment is mounted to the suspension by a rotatable lower swivel member and the seat and first console segment are mounted to the lower swivel member by a rotatable upper swivel member.

4. A vehicle seat assembly, comprising:
a seat suspension mounted to a vehicle;
a seat mounted to the suspension and adapted to swivel relative to the vehicle;
a console also mounted to the suspension and having first and second segments with each console segment housing one or more vehicle control instruments, the first segment adapted to swivel with the seat, and the second segment being mounted to swivel together with the seat and first console segment through one increment of rotation and thereafter to remain in fixed position as the seat and first console segment swivel through a second increment of rotation;
and wherein the second console segment is mounted to the suspension by a rotatable lower swivel member and the seat and first console segment are mounted to the lower swivel member by a rotatable upper swivel member;
and further including a first link device that is actuated so that the swivel members and their respective first and second console segments rotate together through said one increment of rotation.

5. A vehicle seat assembly, comprising:
a seat suspension mounted to a vehicle;
a seat mounted to the suspension and adapted to swivel relative to the vehicle;
a console also mounted to the suspension and having first and second segments with each console segment housing one or more vehicle control instruments, the first segment adapted to swivel with the seat, and the second segment being mounted to swivel together with the seat and first console segment through one increment of rotation and thereafter to remain in fixed position as the seat and first console segment swivel through a second increment of rotation;
and wherein the second console segment is mounted to the suspension by a rotatable lower swivel member and the seat and first console segment are mounted to the lower swivel member by a rotatable upper swivel member;
and further including a first link device that is actuated so that the swivel members and their respective first and second console segments rotate together through said one increment of rotation;
and further including a second link device that is actuated so that the lower swivel member remains generally stationary as the upper swivel member swivels in the second increment of rotation toward a forward facing orientation.

* * * * *